United States Patent
Everard et al.

(10) Patent No.: US 6,285,344 B1
(45) Date of Patent: Sep. 4, 2001

(54) AUTOMATIC ADJUSTMENT OF COLOR BALANCE AND OTHER DISPLAY PARAMETERS IN DIGITAL DISPLAYS

(75) Inventors: James Everard, Kirkland, WA (US); Wei Chen, Newark, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/042,008

(22) Filed: Mar. 13, 1998

(51) Int. Cl.[7] .................................................. G09G 3/36
(52) U.S. Cl. ................................. 345/3; 345/99; 345/213
(58) Field of Search ........................ 345/98, 508, 431, 345/212, 213; 348/97, 229; 382/54; 358/13, 81; 342/99

(56) References Cited

U.S. PATENT DOCUMENTS

| | | | |
|---|---|---|---|
| 4,149,184 | * 4/1979 | Giddings et al. | 358/81 |
| 5,125,046 | * 6/1992 | Siwoff | 382/54 |
| 5,185,655 | * 2/1993 | Wakeland | 358/13 |
| 5,838,336 | * 11/1998 | Ross | 345/508 |
| 5,874,988 | * 2/1999 | Gu | 348/97 |

* cited by examiner

*Primary Examiner*—Steven Saras
*Assistant Examiner*—Uchendu O. Anyaso
(74) *Attorney, Agent, or Firm*—Burns, Doane, Swecker & Mathis, L.L.P.

(57) ABSTRACT

Image data resulting from a digitizing process, for display of an image on a digital display device, is monitored by selectively storing the data in diagnostic registers. This data is analyzed, and used to track the performance of the digitizer on the basis of various operating parameters such as inter-channel balance, intra-channel balance, contrast, brightness, white point, image centering and data clock. A communication channel from the image source provides information regarding the content of the image data being monitored. Based upon the indicated content provided by the image source, the system automatically compensates for any detected error, to thereby maintain optimum performance.

29 Claims, 3 Drawing Sheets

AUTOMATIC ADJUSTMENT OF COLOR BALANCE AND OTHER DISPLAY PARAMETERS IN DIGITAL DISPLAYS

FIELD OF THE INVENTION

The present invention is directed to digital display devices that are used in computer systems and the like, such as flat-panel LCD displays, and more particularly to the automatic inter- and intra-channel balancing of digitizers that are used to display analog video images on digital display devices.

BACKGROUND OF THE INVENTION

The most prevalent interface for computer graphic displays is an analog video signal composed of three channels, typically a red channel, a green channel and a blue channel. This is commonly referred to as an RGB interface. Conventionally, the video signal is applied to a rasterized analog display device, such as a CRT monitor, to generate an image. Normally, the vertical and horizontal sync pulses, which control the raster scanning of the video signal, are provided separately. However they can be embedded on one of the color channels, which is commonly referred to as "composite sync".

More recently, it has become common to display the image on a digital display device. When the RGB signals are displayed on fixed matrix displays, such as desktop LCD displays, the analog signals are usually sampled and digitized, and the resulting values are assigned to discrete pixel locations in the display matrix. Since the video signal is composed of three separate analog channels, the sampler typically consists of three or more separate channels. For higher resolution signals, sampling clock rates are high enough that a three channel sampler may be too costly. In this case, each video channel is often assigned to two or more sampling channels that operate out of phase with each other.

One of the challenges with the analog-to-digital sampling process is that of achieving inter-channel balance among the three colors. In other words, in order to achieve the intended color and contrast fidelity in the displayed image, all three samplers should generate the same data values for the black level, and the same data values for the white level. This is only possible if the channels have nearly identical DC offsets (black level) and gain (white level). It is also important that all three channels have the same monotonic and linear gray-level response.

In the case of a multi-phase system where each color channel has more than one sampler operating at different respective phases, it is also important that the system maintain intra-channel balance. Failure to do so can introduce image distortions such as striping.

In the past, digital display systems have provided the user with a mechanism to manually control the inter-channel balance, usually in the form of a sub-contrast or sub-color control. Such an implementation usually adjusts the gain of each channel independently. This same control is commonly used to also adjust the white point of the display. In addition to adjusting the channel balance, manual user controls are also normally provided to allow the user to adjust the contrast and brightness of the display. This procedure typically involves adjusting the DC offset of all three channels simultaneously, in the case of brightness, and the gain of all three channels simultaneously, in the case of contrast.

In addition to color balance, other operating parameters of the analog-to-digital conversion process affect the quality of the displayed image. Examples of these include the phase and frequency of the data clock that is used for the conversion of the analog signal and the reading of the digital data into the digital display device. Also of interest is the location of the image, e.g. centering and alignment, on the display.

It is desirable to provide for automatic balancing of three separate color sampling channels. Further along these lines, it is desirable to automatically configure a digital display to achieve the maximum contrast and brightness, as well as automatically control the white point of the display, the centering of the image, and the phase and frequency of the data clock.

SUMMARY OF THE INVENTION

In pursuit of the foregoing objectives, the present invention monitors the image data resulting from the digitizing process by selectively storing the data in diagnostic registers. A communication channel from the image source supplies information regarding the content of the image data associated with particular parameters. The data to be stored in the registers is selected by a system controller on the basis of the indicated content. This data is analyzed relative to indicated image data content, and used to track the performance of the digitizer on the basis of various operating parameters such as inter-channel balance, intra-channel balance, contrast, brightness, white point, centering and clock rate. Based upon the indicated content provided by the image source, the system automatically compensates for any detected error in the related parameters, to thereby maintain optimum performance.

Further features of the invention, and the advantages offered thereby, are explained in greater detail hereinafter with reference to a specific embodiment illustrated in the accompanying drawings.

DETAILED DESCRIPTION

To facilitate an understanding of the concepts which underlie the present invention, it is described hereinafter with reference to a particular embodiment thereof, in which computer-generated images are displayed on a liquid-crystal display (LCD) panel. It will be appreciated, however, that the principles of the invention are not limited to this particular embodiment. Rather, the invention will find utility in a variety of different environments where it is desirable to adjust any one or more of the operating parameters of a digital display device.

Figure 1:
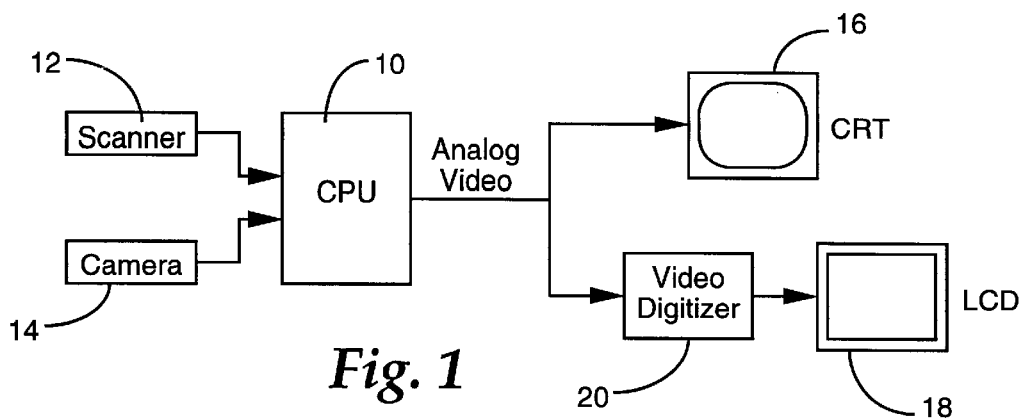
FIG. 1 is a general block diagram of a computer system having both an analog display device and a digital display device.

An example of a typical configuration in which the present invention might be employed is illustrated in FIG. 1. Images to be presented to a viewer are generated within the central processing unit 10 of a computer system. The images might have been created within the CPU itself, using a graphics program, for instance, or imported from another type of image source, e.g. photographs scanned in via an optical scanner 12 or pictures taken by a digital camera 14. To display the images, the CPU causes an analog video signal to be supplied to one or more display devices. The system illustrated in FIG. 1 comprises two display devices, a rasterized CRT monitor 16 and an LCD panel 18. In one possible arrangement, the LCD panel might be the primary display device for the user of the computer system, and the CRT monitor could be used as a secondary display to present the images to a large group of people, such as in a classroom environment. The video signal provided by the CPU consists of two main components, namely RGB data which describes the content of the image, and timing data, in the form of vertical and horizontal synch pulses. Since the CRT monitor 16 is an analog device, the video signal can be directly supplied to it, to display the images. However, the LCD panel 18 is a digital display device, so the analog video signal must first be converted to a digital signal, by means of a video digitizer 20.

Figure 2:
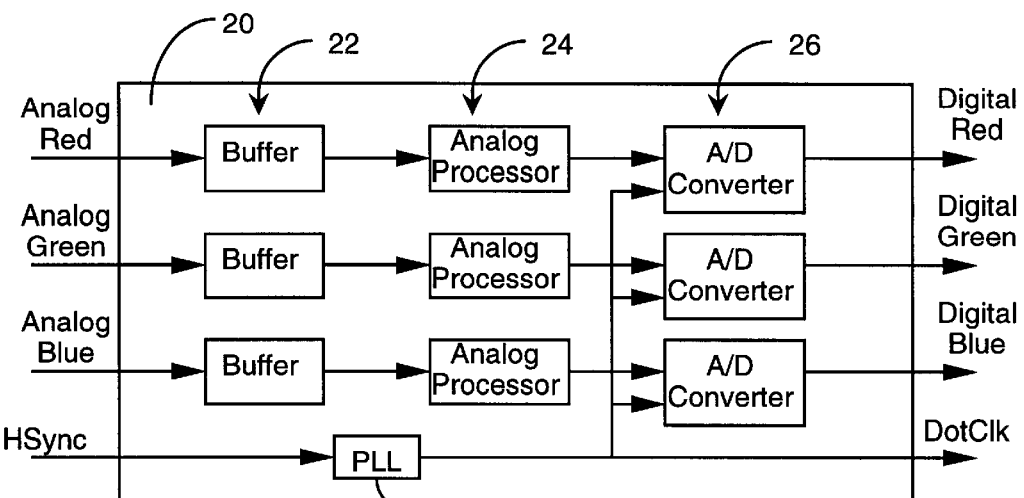
FIG. 2 is a more detailed block diagram of a video digitizer.

A more detailed view of a video digitizer 20 is shown in FIG. 2. The analog video signals for each of the red, green and blue color components are separately presented to corresponding buffers 22. These buffers can be as simple as an AC coupling capacitor with an appropriate termination resistor, or they may involve a more sophisticated function, such as a differential buffer for common mode noise rejection. The output of each input buffer is fed to an associated analog processor 24 which provides for adjustment of the DC offset and dynamic range of the analog video signal, typically referred to as brightness and contrast adjustments. The resulting analog signal is presented to a corresponding analog-to-digital converter block 26. Each block converts the analog video data for one of the color components into digital form for use on the digital display.

The data rate for the digital data is determined by a data clock, which is also referred to as a "dot clock". The dot clock is derived from the horizontal synch pulses of the analog video signal, by means of a phase-locked loop 28. The frequency of the dot clock is determined by the resolution of the display. For example, if the display device has a resolution of 640×480 pixels, the phase-locked loop 28 generates 640 dot clock pulses, plus an offset number of pulses (described hereinafter) for each period defined by two successive horizontal synch pulses. These dot clock pulses are provided to the converter blocks 26 to control the sample rate, as well as to the display device as a data rate clock.

Anywhere in the process of converting the analog video signal to digital data, noise, offsets, or any other form of deviation from the intended signal level can be injected, resulting in an error in the inter-channel balance. In the case of multi-phase channels, such deviations can result in errors for the different processing paths for a given channel, resulting in intra-channel imbalance as well.

Figure 3:
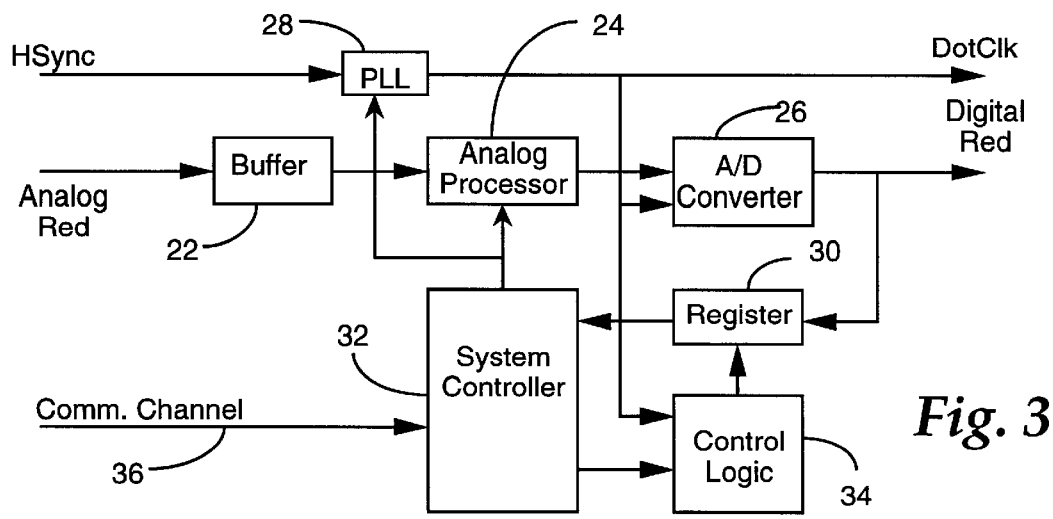
FIG. 3 is a general block diagram of a digital display control system in accordance with the present invention.

In accordance with the present invention, these errors are eliminated by means of a closed-loop control system that operates in conjunction with the digitizer. An example of such a control system is shown in FIG. 3. In the illustrated implementation, diagnostic registers 30 are connected to the digital output stream of the video digitizer, in order to selectively sample image data, under control of a system controller 32. For ease of illustration only one such register is shown in FIG. 3, corresponding to the red color component. Similar registers are also provided for the green and blue components. The system controller commands the diagnostic registers 30 to grab image data, via suitable control logic 34. This data is then read by the controller and used to analyze the performance of the digitizer. If any error is detected, the processor issues the appropriate commands to the analog processor 26 and/or the phase-locked loop 28 to make the required adjustments.

In order to determine if there is any error in the digitizer's output data, the system controller 32 must know what the image data was intended to be. This information is communicated from the image source over a communication channel 36. Any suitable communication channel associated with the image source can be employed for this purpose. For example, if the CPU 10 is a Macintosh computer manufactured by Apple Computer, Inc., the Apple Desktop Bus (ADB) inherent to such a computer can be employed as the communication channel 36. Other known communication buses for various computer-controlled systems can be employed as well, such as a Universal Serial Bus (USB), a Display Data Channel (DDC), or the like.

Figure 4:
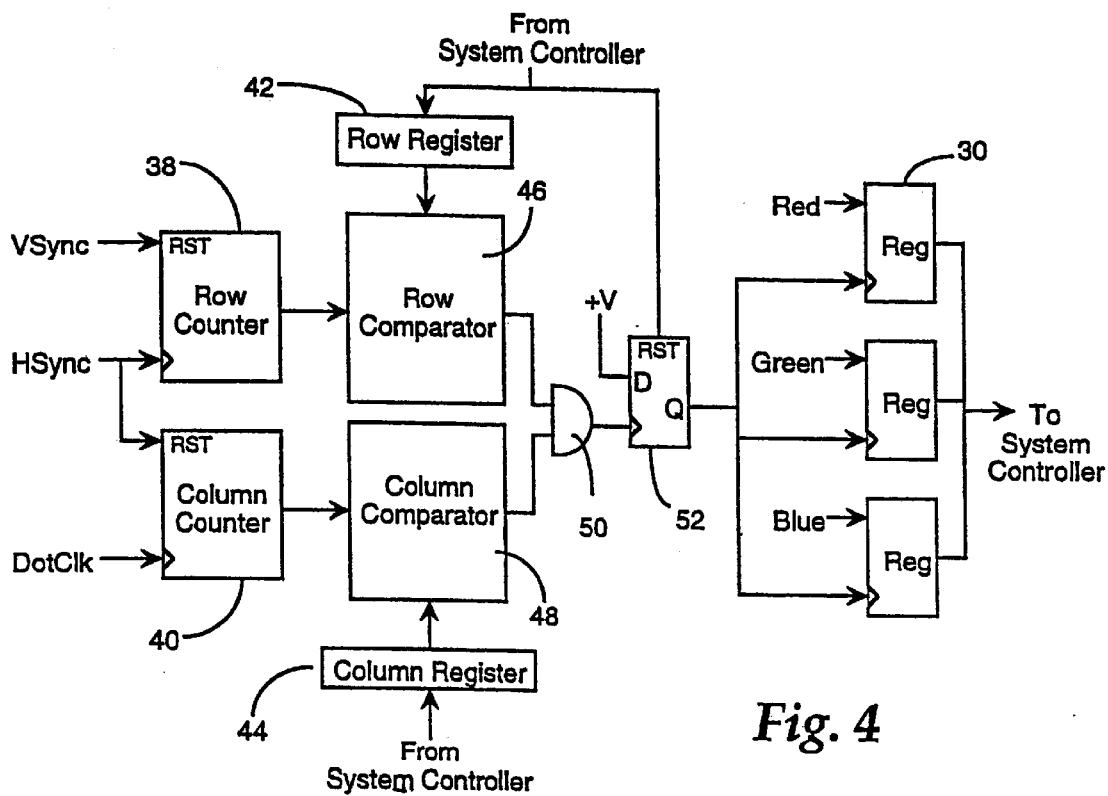
FIG. 4 is a more detailed block diagram of the diagnostic registers and the control logic.

A more detailed view of the diagnostic registers and associated control logic is shown in FIG. 4. A picture element within an image, commonly referred to as a pixel, is defined by its (row, column) coordinate position. To determine the position of each pixel to which the digitized data relates, the control logic includes a row counter 38 and a column counter 40. The origin pixel at position (0,0) is defined by the active edges of the vertical synch signal (VSync) and the horizontal synch signal (HSync). The VSync signal resets the first coordinate to row zero, and the HSync signal resets the second coordinate to column zero. These two synch signals may be coincident, or the HSync signal may lag the VSync signal. Each successive row is indicated by the next active edge of the horizontal synch signal (HSync). The column position within each row is indicated by the dot clock. To determine the coordinate position of image data on the display, therefore, the row counter 38 is reset on each active edge of the VSync signal, and is counted by each successive HSync active edge. Likewise, the column counter 40 is reset by each HSync active edge, and is counted by each successive DotClk pulse.

The system controller 32 designates particular pixel locations whose data values are to be captured in the diagnostic registers 30, for evaluation. The system controller loads the row and column position values for a designated pixel location into respective row and column registers 42 and 44. The count values of the counters 38 and 40 are compared against the row and column values stored in the row and column registers 42 and 44 by suitable comparators 46 and 48. When both of the count values are equal to the values stored in the registers 42 and 44, an AND gate 50 is activated to create a latching pulse that latches the Q output terminal of a flip flop 52 to the TRUE state, as long as the latching flip/flop has been enabled by the system controller. The rising edge of the Q output signal causes the digital data for the designated pixel to be latched into the diagnostic registers 30.

The latching flip/flop 52 is a single shot circuit that is reset by the system controller. Therefore, the stored data will remain in the diagnostic registers until such time as the system controller reads them and then re-enables the circuit by toggling the reset line of the latching flip/flop.

The system controller 32 accepts commands from the image source via the communication channel, monitors the values captured in the diagnostic registers, and commands the analog processing section to make appropriate adjustments. The manner in which the system controller interacts with the various other components to effect these adjustments can best be understood with reference to specific examples that pertain to various operating parameters of the display environment. In the examples which follow, pure black is considered to have a digital value of zero, and pure white has a digital value of 255.

As a first step, it is desirable to achieve inter-channel balance. To provide for inter-channel sampling, the image source generates a true black image. The black area of the image can be over the entire active region, in a portion of the active image region, or even in a portion of the blanking interval. In any case, the image source, e.g. the host CPU 10, informs the system controller 32, via the communication channel 36, that the image data to sample is black and provides the location of the black pixels. Given this information, the system controller 32 configures the register control logic 34 to capture digital pixel data in that location. If desired, the controller can monitor the latching pulse to determine when data is available, or it can simply wait for the next vertical sync pulse before reading the data. The system controller analyzes the diagnostic data and commands the analog processor on each channel to adjust the DC offset.

Figure 5:
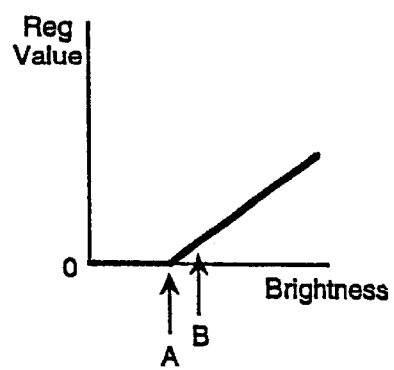
FIG. 5 is a graph of brightness versus data values stored in the diagnostic registers.

FIG. 5 is a chart which illustrates the brightness control that is provided by the analog processor 24 for each channel, relative to the value stored in the diagnostic register. The objective of the first adjustment is to set the DC offset of the analog processor so that it is at point A, at the juncture where the black level data transitions from zero to a positive value. Once the appropriate pixel data has been captured for each of the red, green and blue channels, the system controller 32 determines whether the data values are greater than zero. If a captured value is equal to zero, the controller increases the DC offset for the appropriate channel, and instructs the control logic to load the new "black" data value that results from this adjustment. This step is repeated until a positive, non-zero value is stored in the register, e.g. point B in FIG. 5.

Once a channel is generating a non-zero value for black, the next phase is to gradually decrease the DC offset until point A is reached, at which the value switches to 0. The black level is now properly adjusted.

Figure 6:
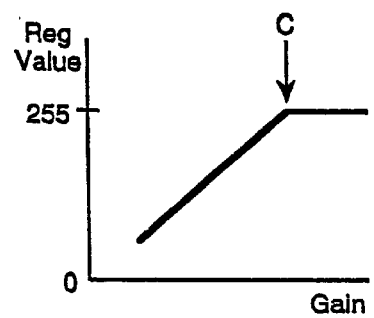
FIG. 6 is a graph of gain versus data values stored in the diagnostic registers.

As a second step, the gain needs to be adjusted. The system controller indicates completion of the black level adjustment, if the communication channel is bi-directional, or simply waits until a predetermined period of time has elapsed if the communications are one-way only. The image source then reverses the image area of interest to be saturated white, and indicates this to the system controller via the communication channel. The system controller once again begins sampling the diagnostic data and takes action on each channel, using a similar approach that is depicted with reference to the chart of FIG. 6. If the value for a channel is 255, the gain of the analog processor for that particular channel is decreased. Once the value for a channel is less than 255, the gain for that particular channel is gradually increased until the point C is reached, at which the value just switches to 255. The gain is now properly adjusted for the white level.

If there is any interaction between the DC offset adjustment and the gain adjustment, the foregoing sequence may need to be iterated two or more times to achieve the ideal adjustment setting. Once completed, the display is balanced across the three color channels. In addition, the brightness and contrast of the display have been maximized as a result of this process.

This same sequence can be extended to a multi-phase system. Instead of processing one value for each color channel, the system controller can analyze multiple sub-channels for each color. The same procedure is followed, by controlling all of the sub-channels for each phase of the system.

In a similar fashion, the white point of the display can be controlled. To this end, instead of adjusting the gain such that white is displayed as 255 for all channels, the system controller can adjust the gain for each color channel to any value x such that 0<x<255 for saturated white. In this way, the color temperature, or white point, of the display can be adjusted across the possible spectrums. It is preferable to do the black level adjustment first, and iterate the adjustments as explained above, especially if there is interaction between the black level and white point adjustments.

Figure 7:
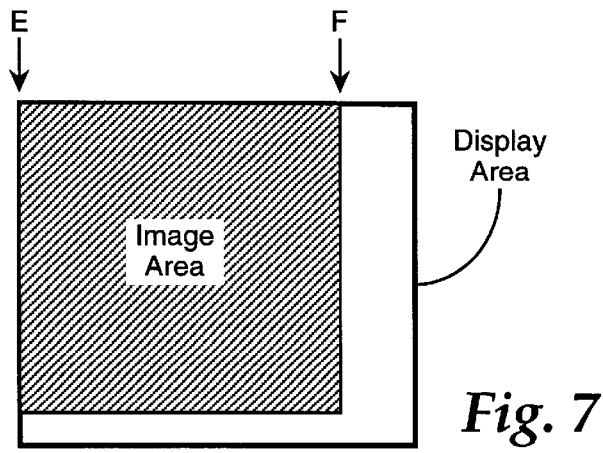
FIG. 7 is an illustration of the area of active video relative to the display area of a digital display device.

Another adjustment to be provided is the centering of the image on the display device. For example, FIG. 7 illustrates a situation in which the area of the image defined by the digital data signals, i.e. the active video, is not the same as the area of the display device that is observed by the viewer. In this particular case, the active video needs to be shifted to the right and downward to be aligned with the area of the display screen.

Figure 8:
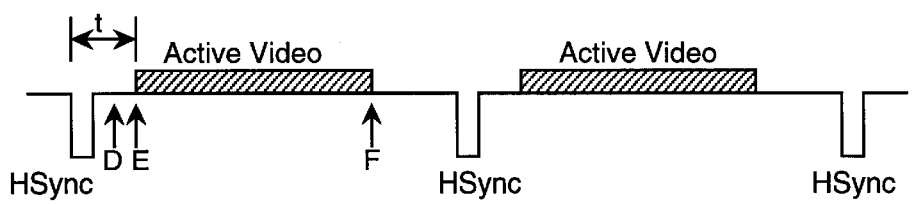
FIG. 8 is a timing diagram of a video signal.

As a first step in the centering process, the first data sample for each line of video needs to be aligned with the location of the first pixel in a row. Referring to FIG. 8, each line of an analog video signal comprises a horizontal synch pulse, followed by a stream of active video data. The proper positioning of the video image on the display device is carried out by determining the amount of delay, t, between the falling edge of the horizontal synch signal and the beginning of the active video data. To make this determination, the image source generates an image that contains non-zero data. The system controller 32 instructs the control logic to sample the data for a pixel at a certain number of dot clock pulses after the horizontal synch signal occurs. If the sampled data value is zero, this means that the active video has not yet begun, as represented by point D in FIG. 8. In this case, the system controller instructs the control logic to load data into the diagnostic registers for successively higher values in the column counter, and checks the value of the data at each location, until the point E is reached at which a non-zero data value is detected, indicating the beginning of the active video. Conversely, if the first sample is a non-zero value, successively smaller values from the column counter are used to load data into the diagnostic registers, until a value of zero is detected. At this time, the number of clock pulses between the falling edge of the horizontal synch signal and the first pixel of the active video is determined. The last value loaded into the column counter is stored as the active video offset t, and provided to the display device to identify the first column of pixels for the active display.

Referring to FIG. 7, the foregoing procedure functions to align the left edge of the active image with the first column of visible pixels in the display. Once this has been achieved, it is then possible to adjust the frequency and phase of the dot clock. The frequency of the dot clock determines the number of pixels per line. Referring again to FIG. 8, it is necessary to detect the lagging edge F of the active video.

Therefore, using a procedure similar to that described above, the system controller instructs the control logic to load pixel data values into the diagnostic registers at a predetermined number of dot clock cycles following the beginning of an active video line. For instance, in a display device having a resolution of 640×480 pixels, the system controller can load a value of 640, plus an offset value of (t-1) determined from the preceding step, into the column register 40. Ideally, the last pixel of the line should be grabbed at this point. If the pixel data stored in the diagnostic register is non-zero, the value in the column register 40 is incremented by 1, and a determination is made whether the new pixel data loaded into the diagnostic register has switched to a value of zero. If so, the end of the active line has been detected at the proper point. If, however, the pixel data for this new location is not zero, the system controller continues to increment the value in the column register, until the point is located that corresponds to the end of the active video, i.e. the pixel data falls to zero. The number of pixel locations between the ideal position and the actual position for the end of the active video is counted, and used to control the phase-locked loop to increase the frequency of the dot clock, and thereby move the right edge of the image in a leftward direction. Conversely, if a pixel data value of zero is detected in the first step, the system controller decrements the value in the column register 40, until a non-zero value is detected in the diagnostic register. The number of steps required to reach this point is counted, and used to decrease the output frequency of the phase locked loop, to thereby move the right edge of the image in a rightward direction, so that it lines up with the edge of the observable portion of the display device.

A similar procedure is carried out to adjust the vertical position of the image on the display screen. In this case, the number of lines of the video signal are counted to detect the first line containing active video after the occurrence of the VSync pulse. This value is then used to determine the vertical offset when the image is displayed on the screen.

Figure 9A:
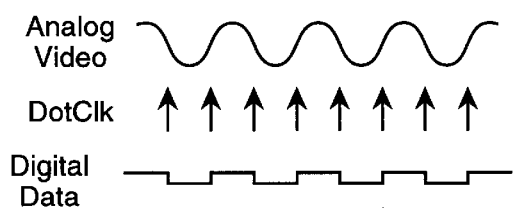
FIGS. 9a and 9b are timing diagrams of analog and digital video data relative to the data clock.
Figure 9B:
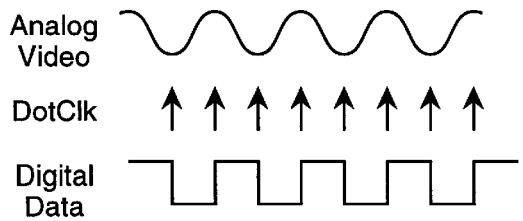

As a final step, the phase of the dot clock is adjusted. For this purpose, the image source generates a line of video which comprises alternating pixels of black and white. The system controller instructs the control logic to successively store each of these pixels in the diagnostic registers. For each clock pulse, the system controller determines whether the values in the registers are sequentially toggling between the appropriate black and white values. Referring to FIG. 9*a*, the analog input signal to the analog-to-digital converters is a sinusoidal signal when the pixels alternate between black and white. If the pulses of the dot clock occur near the edges of each data pulse, the analog-to-digital converters may not accurately detect the true data value. Consequently, values other than zero and 255 might be loaded into the diagnostic registers 30. To correct for this situation, the output phase of the phase locked loop is incrementally adjusted by the system controller, until the data values stored in the diagnostic registers are toggling between the appropriate minimum and maximum values for black and white, as depicted in FIG. 9*b*.

From the foregoing, it can be seen that the present invention provides a system for automatically adjusting the color balance of a digital display device, as well as other parameters that affect the perceived quality of the display. As a result, the user is relieved of the need to manually adjust these features as the display is connected to different image sources, or as its output characteristics change due to inherent aging of its components. In addition to enhancing the user experience, the automatic adjustment of the present invention benefits the production process, since the adjustments are self-contained and do not require sophisticated measuring equipment or manual adjustments during manufacture.

It will be appreciated by those of ordinary skill in the art that the present invention can be embodied in other specific forms without departing from the spirit or essential characteristics thereof. For example, in the foregoing description, the overall control of the automatic adjustment process is effected by the host CPU 10 which generates the appropriate images for the various steps and instructs the system controller 10 which parameter to adjust. Alternatively, the system controller 32 could function as the master device, and send commands to the CPU 10, or other image source, to inform it of the next image to be generated.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A digital image display system, comprising:
   an image source which generates an analog video signal containing information about plural constituent components of an image and a data signal which identifies the intended content of at least a portion of the image;
   a video digitizer which receives said analog video signal and produces a plurality of digital signals that respectively relate to said plural constituent components of the image;
   a digital display device which receives said digital signals and displays an image defined thereby;
   a plurality of registers which store values relating to the digital signals produced by said video digitizer that correspond to respective components of the image; and
   a controller which receives said data signal from said image source, controls said registers to store data values corresponding to the intended content of the image identified by said data signal, analyzes said stored values relative to said intended content, and controls said video digitizer to adjust at least one operating parameter thereof to cause the digital signals produced thereby to conform to said intended content.

2. The display system of claim 1, wherein said video digitizer includes plural analog processors that respectively correspond to said plural constituent components, and said controller controls each of said analog processors to adjust voltage offset and gain values to provide inter-component balance of brightness and contrast.

3. The display system of claim 1 wherein said video digitizer includes a clock generator, and said controller controls said clock generator to adjust at least one of the phase and frequency of a clock signal produced by said clock generator to provide a desired image resolution on the display device.

4. A system for automatically adjusting operating parameters that pertain to the display of an image on a digital display device, comprising:
   a video digitizer which receives an analog video signal and produces a digital signal of an image to be displayed on a digital display device;
   a register which selectively stores values relating to the digital signal produced by said video digitizer; and
   a controller which receives data from an image source relating to the intended content of the values stored in said register, and controls said video digitizer to adjust at least one operating parameter thereof to cause the digital signal produced thereby to conform to said intended content.

5. The system of claim 4, wherein said analog video signal contains information about plural components of the image, and wherein said register separately stores values for each of said plural components.

6. The system of claim 5, wherein said plural components comprise the red, green and blue components of a color image.

7. The system of claim 4, wherein the data from the image source also identifies the location of particular content within an image, and said controller instructs said register to store data appearing at the identified location.

8. The system of claim 4 wherein said video digitizer includes an analog video processor having an adjustable DC offset, and said controller controls said processor to adjust the DC offset to provide an intended black level value.

9. The system of claim 4 wherein said video digitizer includes an analog video processor having an adjustable gain, and said controller controls said processor to adjust the gain to provide an intended white level value.

10. The system of claim 4 wherein said video digitizer includes a clock generator having an adjustable frequency, and said controller controls said clock generator to adjust the frequency to provide a desired display resolution.

11. The system of claim 4 wherein said video digitizer includes a clock generator having an adjustable phase, and said controller controls said clock generator to adjust the phase to provide a data clock for said digital signal.

12. A digital image display system, comprising:
an image source which generates an analog video signal containing information about plural constituent components of an image;
a video digitizer which receives said analog video signal and produces a plurality of digital signals that respectively relate to said plural constituent components of the image;
a digital display device which receives said digital signals and displays an image defined thereby;
a plurality of registers which selectively store values relating to the digital signals produced by said video digitizer; and
a controller which receives data from said image source relating to the intended content of the values stored in said registers, and controls said video digitizer to adjust at least one operating parameter thereof to cause the digital signals produced thereby to conform to said intended content.

13. The system of claim 12 wherein said constituent components comprise the red, green and blue color components of a color image.

14. The system of claim 12 wherein said video digitizer includes an analog video processor having an adjustable DC offset, and said controller controls said processor to adjust the DC offset to provide an intended black level value.

15. The system of claim 14, wherein said image source generates a black image, and said controller adjusts said DC offset to be at a point of transition between a desired black value and a non-black value.

16. The system of claim 12 wherein said video digitizer includes an analog video processor having an adjustable gain, and said controller controls said processor to adjust the gain to provide an intended white level value.

17. The system of claim 16, wherein said image source generates a white image, and said controller adjusts said gain to be at a point of transition between a desired white value and a non-white value.

18. The system of claim 12 wherein said video digitizer includes a clock generator having an adjustable frequency, and said controller controls said clock generator to adjust the frequency to provide a desired display resolution.

19. The system of claim 12 wherein said video digitizer includes a clock generator having an adjustable phase, and said controller controls said clock generator to adjust the phase to provide a data clock for said digital signals.

20. The system of claim 19, wherein said image source generates an alternating black and white image, and said controller adjusts said phase to produce minimum and maximum values in said registers.

21. The system of claim 12, wherein the data from the image source also identifies the location of particular content within an image, and said controller instructs said registers to store data appearing at the identified location.

22. A method for automatically adjusting operating parameters that pertain to the display of an image on a digital display device, comprising the steps of:
generating an analog video signal and a data signal which identifies the intended content of an image represented by said analog video signal;
processing said analog video signal in accordance with a plurality of operating parameters to produce a digital signal that represents the image;
selectively storing portions of said digital signal that correspond to designated locations within the image;
processing the stored portions of the digital signal to determine their correspondence to the intended content identified by said data signal; and
adjusting said operating parameters to provide a desired correspondence between the stored portions of the digital signal and the intended content at the designated locations.

23. The method of claim 22, wherein one of said operating parameters is a voltage offset and wherein said voltage offset is adjusted to provide an intended black level value for the stored portions of the digital signal.

24. The method of claim 22 wherein one of said operating parameters is gain, and wherein said gain is adjusted to provide an intended white level for the stored portions of the digital signal.

25. A method for automatically adjusting operating parameters that pertain to the display of an image on a digital display device, comprising the steps of:
generating an analog video signal that describes plural components of an image, and a data signal which identifies the intended content of the image represented by said analog video signal;
processing said analog video signal in accordance with a plurality of operating parameters to produce a plurality of digital signals that respectively represent the plural components of the image;
selectively storing portions of said digital signals that correspond to designated locations within the image;
separately processing the stored portions of the digital signals for each of the plural components of the image to determine their correspondence to the intended content identified by said data signal; and adjusting operating parameters associated with each of the plural components of the image to provide a desired correspondence between the stored portions of the digital signals and the intended content at the designated locations for each of said plural components.

26. The method of claim 25, wherein one of said operating parameters is a voltage offset and wherein said voltage offset is separately adjusted for each of said plural components to provide an intended black level value for the stored portions of the digital signals that is balanced among all of said components.

27. The method of claim 25 wherein one of said operating parameters is gain, and wherein said gain is separately adjusted for each of said plural components to provide an intended white level for the stored portions of the digital signals that is balanced among all of said components.

28. The method of claim 25 wherein said plural components comprise individual primary color components of a color image.

29. The method of claim 25 wherein said plural components comprise the red, green and blue components of a color image.

* * * * *